United States Patent [19]

Yasunobu et al.

[11] Patent Number: 4,761,599
[45] Date of Patent: Aug. 2, 1988

[54] MOTOR CONTROLLER

[75] Inventors: Isamu Yasunobu; Kenichi Ohara, both of Hirakata; Nobuho Shibata, Katano; Shigeo Neki, Asahi, all of Japan

[73] Assignee: Matsushita Electric Industrial Co., Ltd., Osaka, Japan

[21] Appl. No.: 34,425
[22] PCT Filed: Jul. 11, 1986
[86] PCT No.: PCT/JP86/00353
 § 371 Date: Mar. 16, 1987
 § 102(e) Date: Apr. 24, 1987
[87] PCT Pub. No.: WO87/00705
 PCT Pub. Date: Jan. 29, 1987

[30] Foreign Application Priority Data

Jul. 16, 1985 [JP] Japan .................... 60-156457

[51] Int. Cl.⁴ .............................. H02P 3/20
[52] U.S. Cl. ........................ 318/723; 318/740
[58] Field of Search ........... 318/722, 723, 721, 801, 318/803, 811, 739, 740

[56] References Cited

U.S. PATENT DOCUMENTS

4,227,138 10/1980 Espelage et al. ............... 318/801

Primary Examiner—David Smith, Jr.
Attorney, Agent, or Firm—Wenderoth, Lind & Ponack

[57] ABSTRACT

This invention relates to a motor controller which is so arranged that voltage to be applied to drive windings of a synchronous motor (1) is switched by a plurality of switching elements of a power inverter circuit (4), while the current supply amount to the switching elements is controlled based on pulse width-modulated signals, and which is provided, at a distributing section for selecting energization of said switching elements, with a first logic circuit for applying the pulse width modulation only to the predetermined switching selected from among the switching elements selected during forward rotation of the motor, and a second logic circuit for applying the pulse width modulation to all of the switching elements selected during the reverse rotation of the motor, so as to thereby effect the reduction of electro-magnetic noise during the forward rotation, and to effect the suppression of current during the reverse rotation.

4 Claims, 8 Drawing Sheets

|  | FORWARD ROT. | REVERSE ROT. |
|---|---|---|
| (d) DR | ——————— | ——————— |
| (e) PWM | ⊓⊓⊓⊓⊓ | ⊓⊓⊓⊓⊓ |
| (f) $u^+$ | ⊓⊓⊓⊓⊓ | |
| (g) $V^+$ | | |
| (h) $W^+$ | | ⊓⊓⊓⊓⊓ |
| (i) $u^-$ | | ⊓⊓⊓⊓⊓ |
| (j) $V^-$ | | |
| (k) $W^-$ | ⊓⊓⊓⊓⊓ | |
| (ℓ) $i_L$ | ∧∧∧∧∧ | ∨∨∨∨∨ |

MOTOR CONTROLLER

FIELD OF TECHNOLOGY

The present invention relates to a motor controller for use in an AC servo-motor of a synchronous motor type or the like.

More particularly, the present invention relates to an improved motor controller which is arranged to effect a forward/reverse rotation control so as to rotate the motor at a speed corresponding to a speed instruction by applying to the synchronous motor, a reverse rotation torque corresponding to a magnitude of a signal if the speed adjusting instruction is of an adjusting signal larger than a predetermined level, while applying to said synchronous motor, a forward rotation torque corresponding to a magnitude of a signal, if the speed adjusting instruction is of a signal other than the above adjusting signal.

BACKGROUND ART

Although various kinds of control systems are available for the AC servo-motor of a synchronous motor type depending on end uses, a control system based on a square wave current is advantageous from the viewpoint of cost, in a field where comparatively less accuracy is required.

Figure 5:
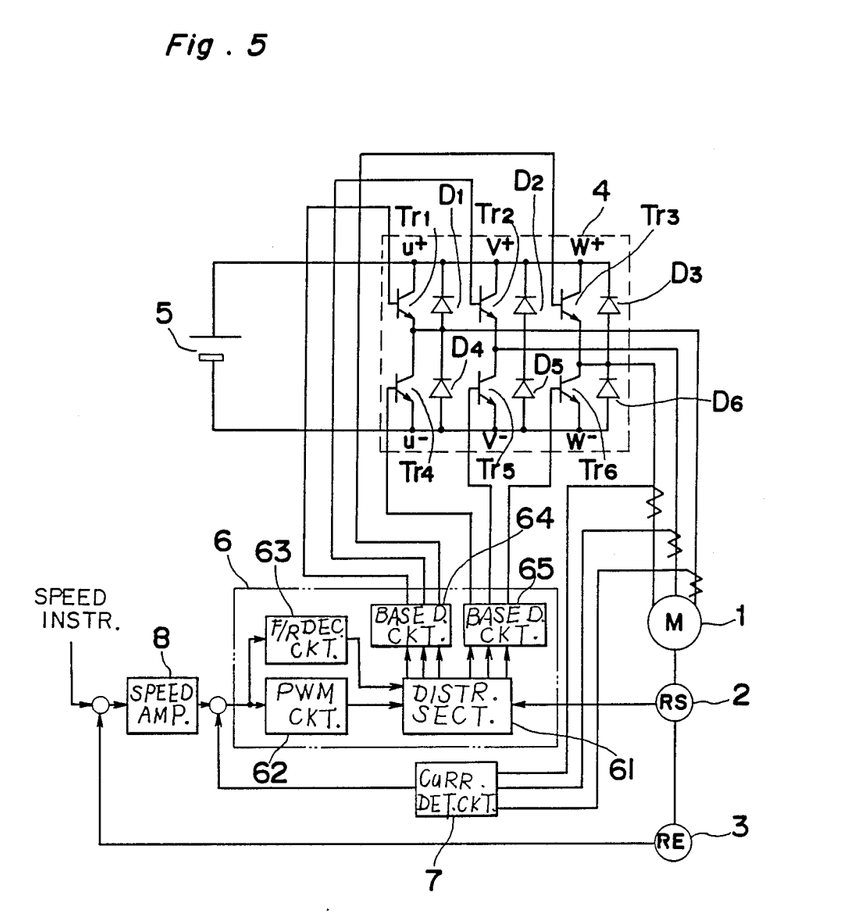
FIG. 5 is a construction diagram of a conventional motor controller.

FIG. 5 shows one example of the AC servo-motor referred to above.

In FIG. 5, there are included a synchronous motor 1 provided with a permanent magnet rotor and three-phase drive windings, a rotor position sensor 2 connected to the synchronous motor 1 for detecting the rotor position, a rotary encoder 3 for detecting the rotating direction and speed of the synchronous motor 1, and a power inverter circuit 4 including power transistors Tr1 to Tr6 for switching current to be fed to the respective drive windings of the synchronous motor 1 and diodes D1 to D6 connected in parallel to the respective transistors Tr1 to Tr6. There are also provided a DC power source 5, and a control section 6 for controlling the energization of the transistors Tr1 to Tr6 of the power inverter circuit 4, constituted by blocks as described hereinbelow.

Specifically, there are provided a distributing section 61 which receives signals from the rotor position sensor 2, a PWM circuit 62 and a forward/reverse decision circuit 63, and which outputs a signal indicating which of the transistors of said power inverter circuit 4 should be turned on. The PWM circuit 62 produces pulse width-modulated (referred to as PWM hereinafter) signals corresponding to a speed adjusting signal to be described later, while the forward/reverse decision circuit 63 outputs signals indicating in which direction of the forward and reverse directions, the torque of the synchronous motor 1 should be produced by the speed adjusting instruction to be described later. There are also provided a base drive circuit 64 for controlling the base current of transistors Tr1, Tr2 and Tr3 connected to a plus side of the DC power source 5, and another base drive circuit 65 for similarly controlling the base current of transistors Tr4, Tr5 and Tr6 connected to a minus side of the DC power source 5, a current detecting circuit 7 for detecting the current flowing through the drive windings of the synchronous motor 1, and a speed amplifier 8 for amplifying the difference between the speed instruction and the output signal of the rotary encoder 3. It is to be noted here that the output of the speed amplifier 8 is compared with the output of the current detecting circuit 7, and is applied to the PWM circuit 62 and the forward/reverse decision circuit 63 as the speed adjusting instruction.

Figure 6:
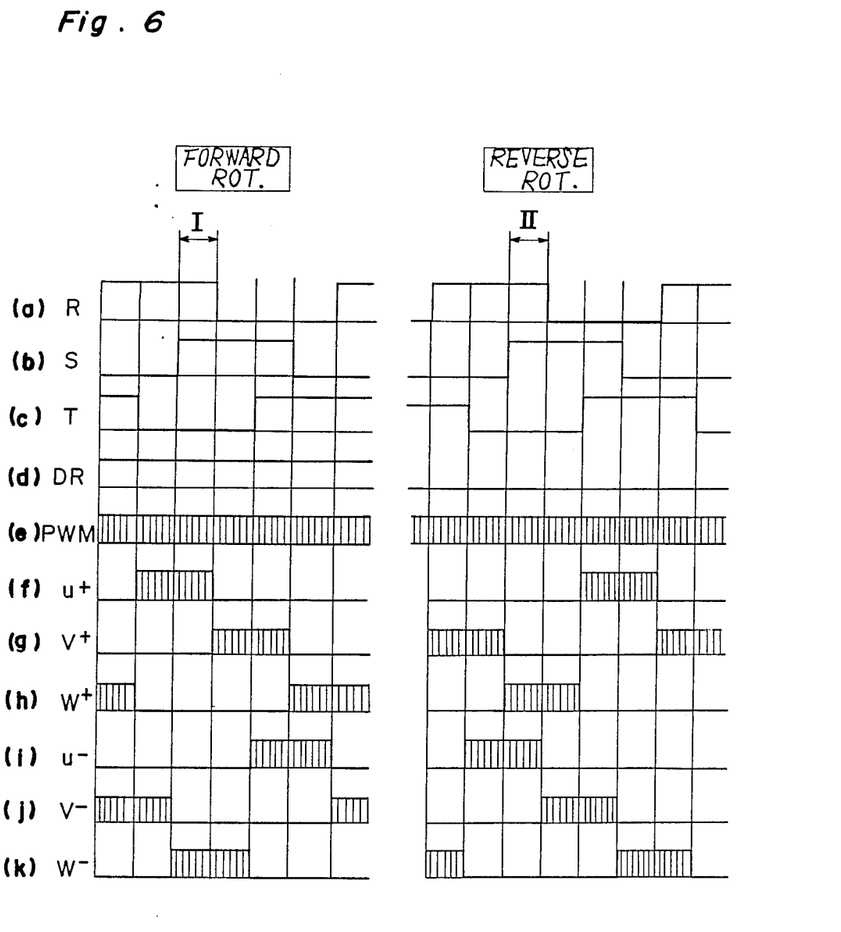
FIG. 6 shows waveform diagrams representing functions in the diagram of FIG. 5, FIGS. 7 and 8 are diagrams only of control sections as picked out from the conventional motor controller.

In FIG. 6 showing the functions of the distributing section 61, (a), (b) and (c) represent positional signals which differ in their electrical phase angle by 120° and which are outputted from the rotor position sensor 2; (d) denotes an output of the forward/reverse decision circuit, with a "High" level showing the forward rotation and a "Low" level indicating the reverse rotation; (e) represents an output signal of the PWM circuit 62, and (f) to (k) show output signals of the distributing circuit 61 to be applied to the base drive circuits 64 and 65.

Subsequently, functioning of the AC servo-motor having the constructions as described above will be briefly explained.

Now, consideration will be given to a case where the actual rotational speed of the synchronous motor 1 is low with respect to the speed instruction.

The output of the speed amplifier 8 obtained through comparison and amplification of the speed instruction and the signal of the rotary encoder 3, becomes an output in a direction of acceleration, while the speed adjusting instruction obtained through comparison of the output of said speed amplifier 8 with the output of the current detecting circuit 7 and applied to the forward/reverse decision circuit 63 and the PWM circuit 62, becomes an acceleration signal. Accordingly, the forward/reverse decision circuit 63 outputs the forward rotation decision, and simultaneously, the PWM output of the PWM circuit 62 moves in a direction to increase its ON duty factor, and consequently, the current flowing into the drive windings of the synchronous motor 1 is increased for acceleration. Since this acceleration is effected until the speed instruction and the signal of the rotary encoder 3 coincide with each other (correctly, steady-state deviation remains), the speed of the synchronous motor 1 ultimately becomes the value of the speed instruction.

Meanwhile, in the case where the speed of the synchronous motor 1 is higher than the value of the speed instruction, the output of the forward/reverse decision circuit 63 becomes the reverse rotation decision and the synchronous motor 1 is decelerated as will be seen from the foregoing description.

Figure 7:
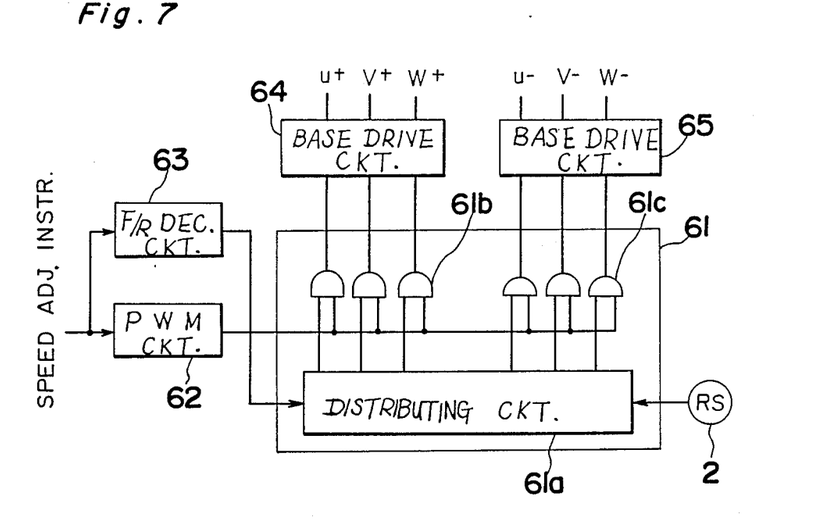
Figure 8:
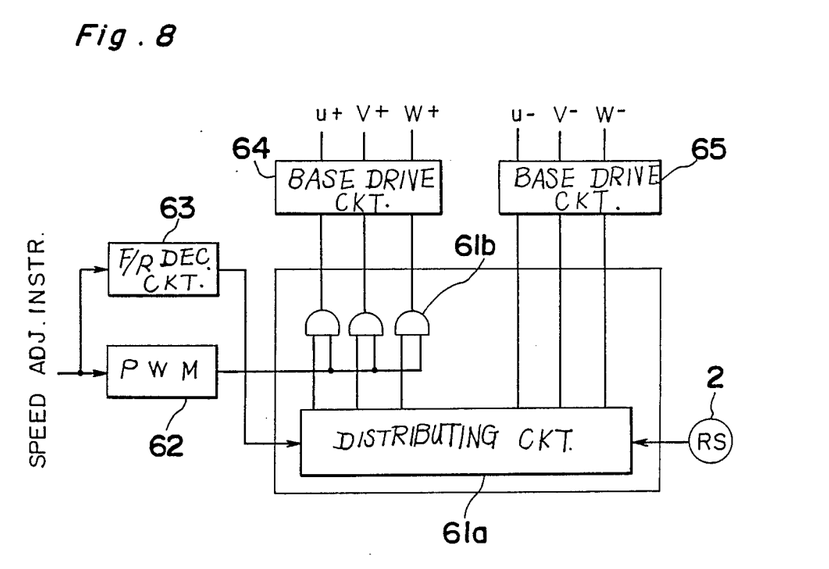

FIGS. 7 and 8 show only the control section 6 as picked up from the conventional motor control arrangement of FIG. 5, and represent two systems conventionally adopted for subjecting the base drive signal to the PWM modulation. In FIGS. 7 and 8, the distributing section 61 is constituted by a distributing circuit 61a which receives the outputs of the rotor position sensor 2 and the forward/reverse decision circuit 63 for outputting the base signal corresponding thereto and is also constituted by the AND circuits 61b and 61c.

Figure 9A:
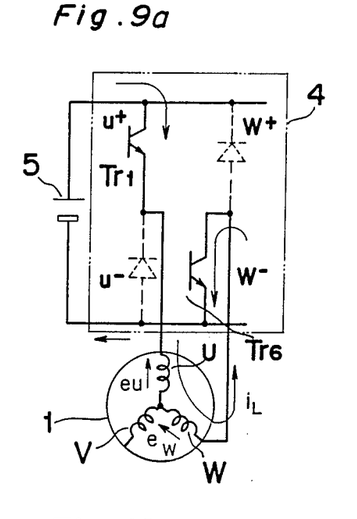
FIG. 9 shows diagrams representing functions of the control section of FIG. 7.
Figure 9B:
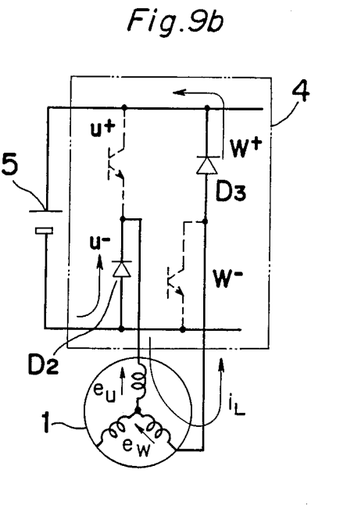
Figure 10:
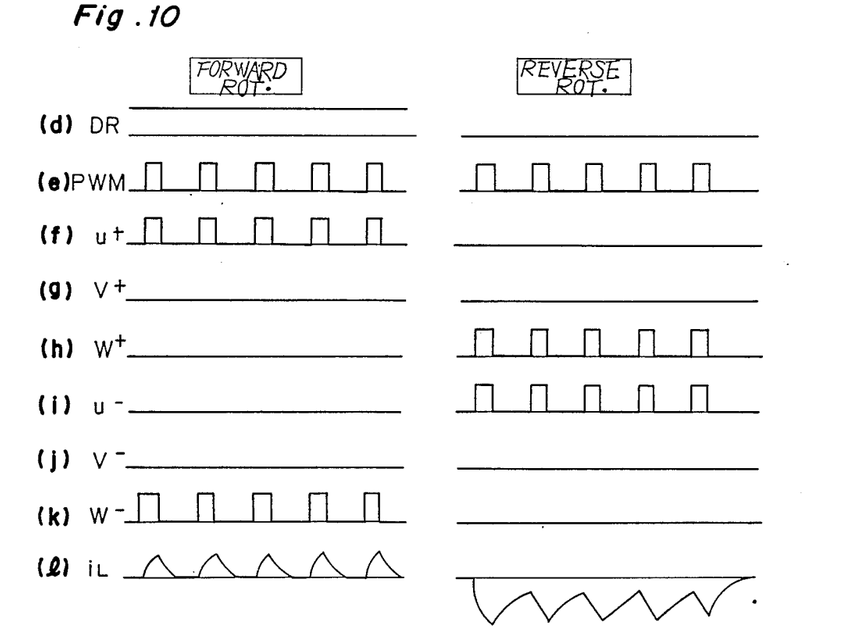
FIG. 10 shows waveform diagrams illustrating functions of the control section of FIG. 7.

FIGS. 9(a)–9(b) and 10 show functions of the circuit of FIG. 7.

FIG. 9(a) shows a case where the transistors Tr1 and Tr6 are ON, with the other transistors turned OFF in the state of the forward rotation, and the current is flowing through the U phase→W phase of the drive windings of the synchronous motor 1, and FIG. 9(b) shows the function in the case where the transistors Tr1 and Tr6 are turned OFF from the state in FIG. 9(a). Upon application of the PWM modulation, the functions of FIG. 9(a)↔FIG. 9(b) are to be repeated. In FIG. 10 showing the functioning waveforms, (d) represents the output of the forward/reverse decision circuit 63; (e) shows the output of the PWM circuit 62, (f), (g) and (h) denote the outputs of the base drive circuit 64; (i), (j) and (k) represent the outputs of the base drive circuit 65, and (l) indicates the waveform of the current flowing through the U phase→W phase of the drive windings of the synchronous motor 1. FIG. 10 may be regarded as the portions I and II in FIG. 6 as picked out, with corresponding symbols being used therebetween.

In the above prior art system, since the transistors at the plus side and minus side of the DC power source are both turned OFF during the PWM modulation, ripples in the current tend to be increased, thus resulting in a drawback such as the generation of electro-magnetic noise. This fact invites a particularly serious problem in a motor in which low noise operation is required.

Figure 11A:
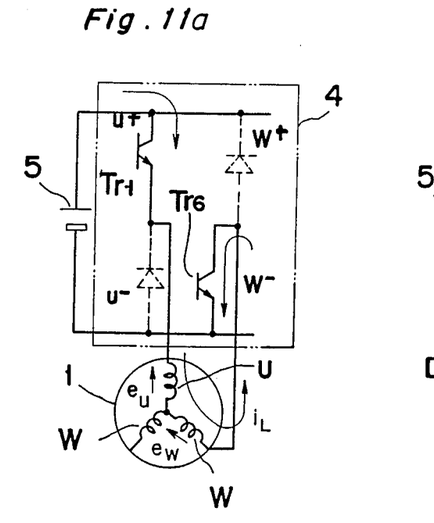
FIG. 11 shows diagrams representing functions of the control section of FIG. 8.
Figure 11B:
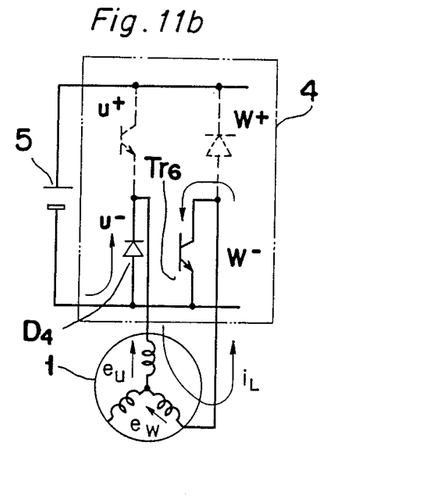
Figure 12:
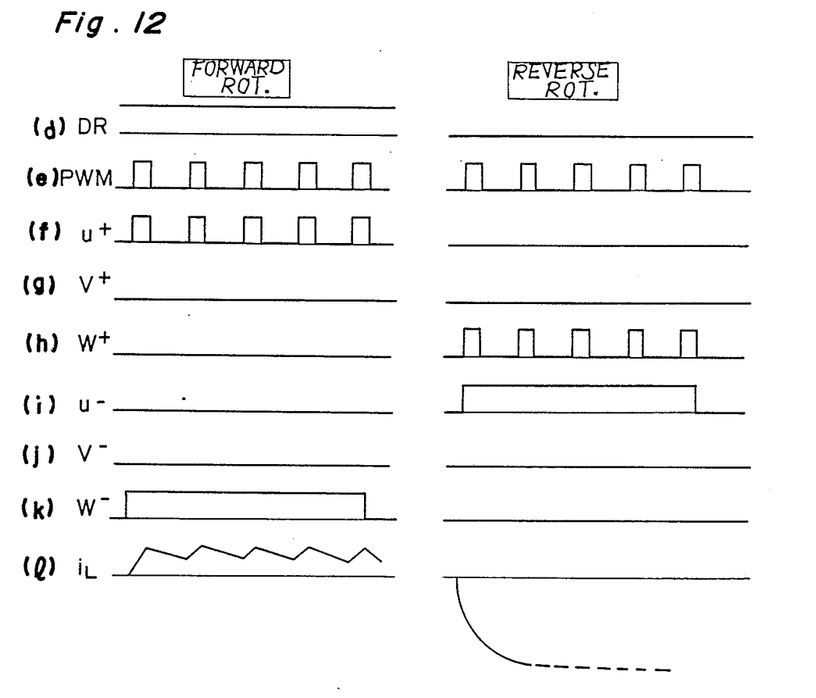
FIG. 12 shows waveform diagrams representing functions of the control section of FIG. 8.

FIGS. 11(a)-11(b) and 12 show functions of another system, i.e., the circuit of FIG. 8. FIG. 11(a) shows the case where the current is flowing in U phase→W phase of the drive windings of the synchronous motor 1 in the state of the forward rotation, and FIG. 11(b) represents the function in the case where only the transistor Tr1 is turned OFF from the state of FIG. 11(a). Upon application of PWM modulation, the functions of FIG. 11(a)↔FIG. 11(b) are to be repeated.

In FIG. 12 showing the functioning waveforms, (d) represents the output of the forward/reverse decision circuit 63; (e) shows the output of the PWM circuit 62; (f), (g) and (h) denote the outputs of the base drive circuit 64; (i), (j) and (k) represent the outputs of the base drive circuit 65, and (l) indicates the waveform of the current flowing through the U phase→W phase of the drive windings of the synchronous motor 1. FIG. 12 may be regarded as the portions I and II in FIG. 6 as picked out, with corresponding symbols being used therebetween. In this system, since the PWM modulation is applied only to the transistors connected to the plus side of the DC power source 5 (referred to as UPPER transistors hereinafter), the ripples of current flowing through the synchronous motor 1 are reduced during the forward rotation, thus making it possible to realize a silent motor with less electro-magnetic noise. On the contrary, however, during the reverse rotation, there occurs such a phenomenon that, even when the transistors at the plus side of the DC power source 5 are turned OFF, the current represented by (induced voltage of the motor)÷(impedance of the coil) continues to flow through the transistors at the minus side (referred to as LOWER transistors hereinafter) thereof. Therefore, although this system may be utilized for the control of a small-sized motor with a small induced voltage and a comparatively large coil impedance, it can not be applied to a large-sized motor in which the current is undesirably dissipated irrespective of the PWM modulation.

The present invention has for its object to effect reduction of the electro-magnetic noises during the forward rotation, and suppression of current during the reverse rotation through elimination of disadvantages inherent in the conventional systems of this kind.

SUMMARY OF THE INVENTION

In accomplishing the above object, according to the present invention, there is provided a motor controller which includes a power inverter circuit provided with a plurality of switching elements for controlling a voltage applied to drive windings of a synchronous motor, a speed adjusting instruction circuit for outputting a speed adjusting instruction for the synchronous motor, a PWM circuit for outputting a pulse width modulation signal according to the speed adjusting instruction, a forward/reverse decision circuit for outputting a reverse rotation instruction signal if the speed adjusting instruction is of a speed reduction signal above a predetermined level and for outputting a forward rotation instruction signal if said speed adjusting instruction is of signals other than said speed reduction signal, a distributing circuit for outputting a switching signal for determining the switching state of said power inverter circuit by a signal of a rotor position sensor and the forward/reverse rotation instruction, a first logic circuit applied with outputs of said distributing circuit and PWM circuit as inputs, and outputting a drive signal for the switching elements of said power inverter circuit connected to the minus (or plus) side of said DC power source, and a second logic circuit applied with outputs of said distributing circuit, PWM circuit and forward/reverse decision circuit as inputs, and outputting a drive signal for the switching elements of said power inverter circuit connected to the plus (or minus) side of said DC power source, and is characterized in that said first logic circuit is arranged to render the predetermined switching elements conductive only when the outputs of said distributing circuit and PWM circuit are both of ON signals, and said second logic circuit is arranged to render the predetermined switching elements conductive when the outputs of said PWM circuit and distributing circuit are both of ON signals or when the output of the forward/reverse decision circuit is of the forward rotation signal, with the output of the distributing circuit being of an ON signal.

By the above arrangement according to the present invention, in the state where the motor is rotating in the forward direction, the PWM modulation is applied only to the switching elements connected to the plus side (or minus side) of the DC power source, while in the state where the motor is rotating in the reverse direction, the PWM modulation is to be applied to the switching elements connected to both plus and minus sides of said DC power source.

DESCRIPTION OF THE PREFERRED EMBODIMENT

Subsequently, one preferred embodiment of the present invention will be described with reference to the accompanying drawings.

Figure 1:
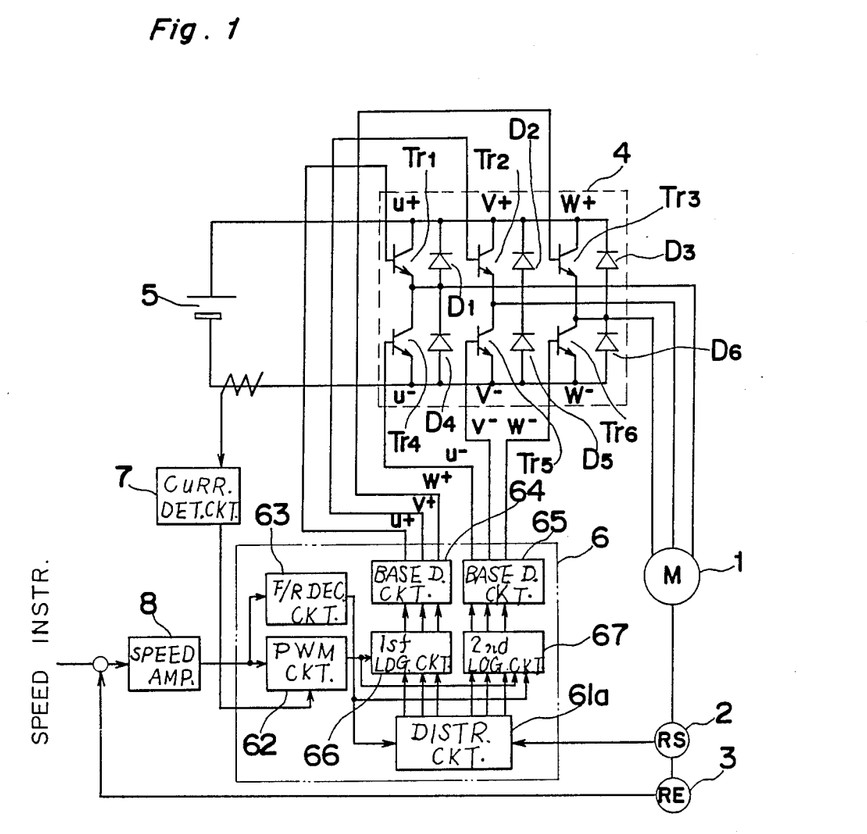
FIG. 1 is a construction diagram of a motor controller according to one preferred embodiment of the present invention.

FIG. 1 shows the construction of a motor controller according to one preferred embodiment of the present invention.

In FIG. 1, there are provided a synchronous motor 1, a rotor position sensor 2, a rotary encoder 3, a power inverter circuit 4, a DC power source 5, a control section 6, and a speed amplifier 8, each having the construction similar to that of FIG. 5.

There are also shown a distributing circuit 61a which receives signals of a rotor position sensor 2 and a forward/reverse decision circuit 63 so as to output a base drive signal, a PWM circuit 62 receiving the speed adjusting signal which is an output of the speed amplifier 8 and outputting the PWM signal corresponding thereto, the forward/reverse decision circuit 63 which receives the speed adjusting instruction for outputting the forward rotation or reverse rotation signal corresponding thereto, base drive circuits 64 and 65 for driving transistors Tr1 to Tr6 of the power inverter circuit 4, a first logic circuit 66 which receives signals from the PWM circuit 62 and distributing circuit 61a for applying outputs to the base drive circuit 64, a second logic circuit 67 which receives signals from the PWM circuit 62, forward/reverse decision circuit 63, and distributing circuit 61a for applying signals to the base drive circuit 65, and a current detecting circuit 7 for detecting the current flowing through the DC power supply 5.

With respect to the motor controller having the constructions as described above, the functioning thereof will be described hereinbelow.

In the first place, upon application of the speed instruction, the signal thereof is compared with the signal of the rotary encoder 3 and amplified by the speed amplifier 8 so as to be applied to the PWM circuit 62 and the forward/reverse decision circuit 63 as the speed adjusting instruction. The PWM circuit 62 which has received the speed adjusting instruction, outputs the PWM signal corresponding to the magnitude of the signal. Similarly, upon receipt of the speed adjusting signal, the forward/reverse decision circuit 63 outputs the reverse rotation signal if the signal is a deceleration signal higher than a predetermined level, and the forward rotation signal if the signal is of a signal other than the above.

The distributing circuit 61a receives the signal of the rotor position sensor 2 and the signal of the forward/reverse decision circuit 63, and outputs base driving signals for driving the power inverter circuit 4 so as to produce a forward rotation torque or reverse rotation torque at high efficiency in the synchronous motor 1.

The first logic circuit 66 subjects the signal from the distributing circuit 61a to the PWM modulation by the signal from the PWM circuit 61 for application to the base drive circuit 64.

In the case where the signal of the forward/reverse decision circuit 63 is of the forward rotation signal, the second logic current 67 also subjects the signal of the distributing circuit 61a to the PWM modulation by the signal of the PWM circuit 62 so as to be applied to the base drive circuit 65 in the similar manner as in the first logic circuit 66, but when said signal is of the reverse rotation signal, the signal of the distributing circuit 61a is outputted as it is, without application of the PWM modulation. The base drive circuits 64 and 65 amplify the signals of the first logic circuit 66 and the second logic circuit 67 for driving the transistors Tr1 to Tr6 of the power inverter circuit 4.

By the above functions, if the speed adjusting instruction is of the adjusting signal larger than a predetermined level, a reverse rotation torque corresponding to the magnitude of said signal is applied to the synchronous motor 1, while if said speed instruction signal is of a signal other than the above, a forward rotation torque corresponding to the magnitude of said signal is applied to the synchronous motor 1, and as a result, said synchronous motor 1 is so controlled as to be rotated at a speed corresponding to the speed instruction.

It will be seen simultaneously that the motor controller of the present invention as described so far solves the problem of electro-magnetic noises during the forward rotation and the problem of circulating current during the reverse rotation as shown with reference to the conventional example, by applying the PWM modulation only to the UPPER transistors in the case where the output of the forward/reverse decision circuit 63 is of a forward rotation signal, i.e., where the forward rotation torque is applied to the synchronous motor 1, and also, by applying the PWM modulation to both of the UPPER and LOWER transistors in the case where said output is of a reverse rotation signal, i.e., where the reverse rotation torque is applied to said synchronous motor 1.

Figure 2:
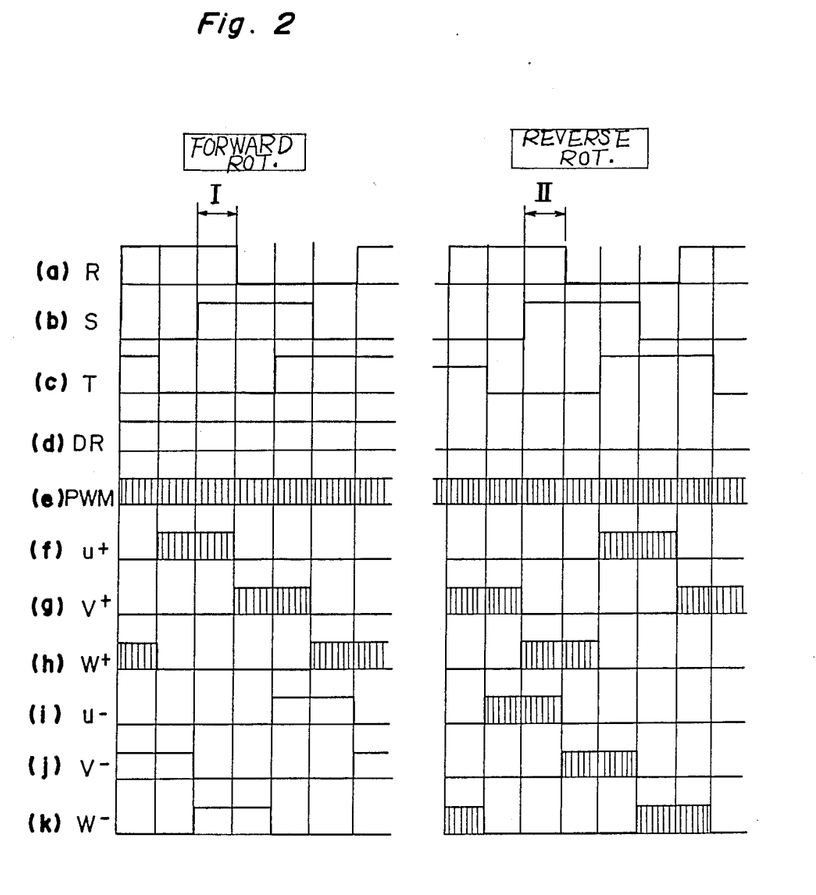
FIG. 2 shows waveform diagrams representing functions at various parts in FIG. 1.

FIG. 2 shows waveform diagrams at various parts for better understanding of the functions in the circuit of FIG. 1. In FIG. 2, (a), (b) and (c) represent the output signals of the rotor position sensor 2, (d) denotes the output signal of the forward/reverse decision circuit 63, with "High" level indicating the forward rotation and "Low" level the reverse rotation, (e) shows the output signal of the PWM circuit 62, (f), (g) and (h) represent the output signals of the base drive circuit 64, and (i), (j) and (k) show the output signals of the base drive circuit 65.

Subsequently, a more specific embodiment of the present invention will be described with reference to the attached drawings.

Figure 3:
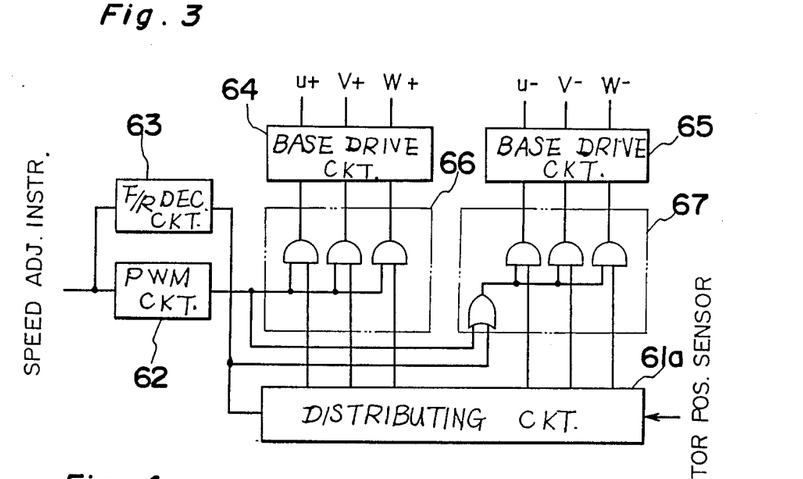
FIG. 3 is a more specific construction diagram of embodiment.

FIG. 3 shows the more specific embodiment of the present invention, with the control section 6 in FIG. 1 being specially picked up.

In FIG. 3, the circuit includes the distributing circuit 61a, the PWM circuit 62, the forward/reverse decision circuit 63, the base drive circuits 64 and 65, the first logic circuit 66, and the second logic circuit 67, in the similar manner as in the construction within the control section 6 in FIG. 1.

The first logic circuit 66 is constituted by AND circuits having the outputs of the distributing circuit 61a and the PWM circuit 62 as inputs, while the second logic circuit 67 is composed of an OR circuit having the outputs of the forward/reverse decision circuit 63 and the PWM circuit 62 as inputs, and AND circuits having the outputs of said OR circuit and the distributing circuit 61a as inputs.

Figure 4:
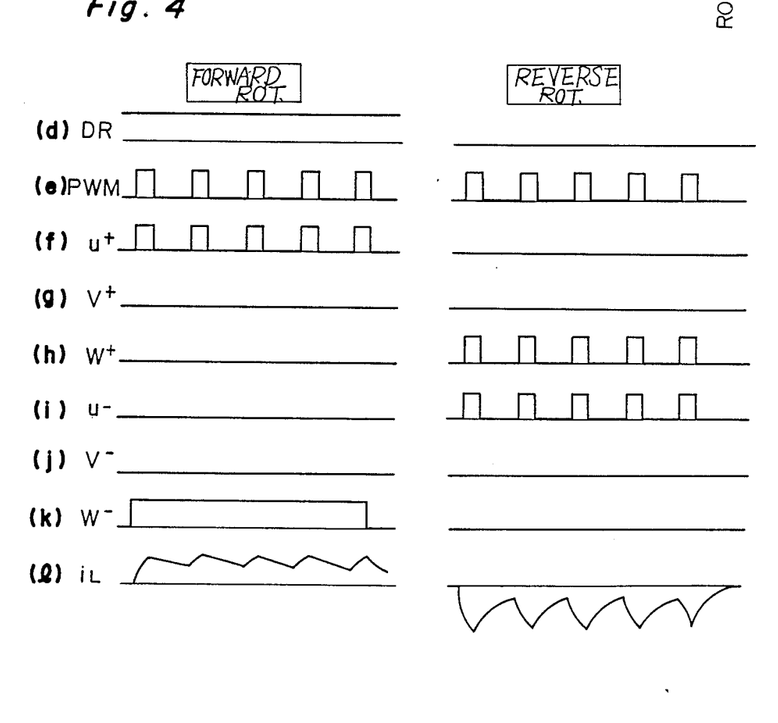
FIG. 4 shows waveform diagrams denoting functions in the diagram of FIG. 3.

FIG. 4 shows waveforms of functions in the circuit of FIG. 3, and represents the case where the PWM modulation is applied in the state in which current is flowing through the U phase→W phase of the synchronous motor (i.e., the state of I and II in FIG. 2). In FIG. 4, (d)

is the output signal of the forward/reverse decision circuit 63, (e) represents the output signal of the PWM circuit 62, (f), (g) and (h) denote the output signals of the base drive circuit 64, and (i), (j) and (k) show the output signals of the base drive circuit 65, in the similar manner as in the signals of FIG. 2, with (l) indicating the waveform of the current flowing through the drive windings of the synchronous motor 1.

Since the functioning of the above circuit is exactly the same as that explained with reference to the circuit of FIG. 1, detailed description thereof is abbreviated here for brevity.

It is needless to say that, although the foregoing embodiment has been described with reference to the synchronous motor of the three-phase full wave driving type, the present invention is not limited in its application to the motor of this type alone.

It should also be noted that in the foregoing embodiment, although the description of the functioning is made in the arrangement not including the current detecting circuit 7, similar effect can be expected even in the case of the motor controller added with the current detecting circuit.

Hereinbelow, the arrangement in which the current detecting circuit is added will be described with reference to FIG. 1.

In FIG. 1, the motor controller according to the present invention includes the current detecting circuit 7 which detects the current flowing through the DC power source 5, and whose output is connected to the PWM circuit 62. This current detecting circuit 7 functions in such a manner that it produces ON signal in the case where the current flowing through the DC power source 5 is smaller than a certain predetermined value, while outputting OFF signal when the current is larger than said predetermined value. The PWM circuit 62 is so arranged as to immediately output the OFF signal irrespective of the speed adjusting instruction (i.e., the state where ON duty of PWM modulation=0) upon receipt of said OFF signal. By the above arrangement, there is constituted a circuit in which the transistors are turned OFF when the current flowing through the DC power source exceeds the predetermined value, thereby to prevent the current from increasing any further.

Needless to say, the effect of the present invention as described so far may be expected even when the above current detecting circuit is added. Moreover, it is possible to employ a micro-computer to constitute the motor controller of the present invention.

As is clear from the foregoing description, according to the present invention, by the function for subjecting only the switching elements of the power inverter circuit connected to the plus side (or minus side) of the DC power source, to the PWM modulation during the forward rotation (more accurately, during the forward rotation torque generation), and also, for applying the PWM modulation to both of the switching elements at the plus side and minus side during the reverse rotation (more accurately, during the reverse rotation torque generation), the current ripples are reduced to permit a low noise operation, through less generation of electromagnetic noises during the forward rotation, while during the reverse rotation, dissipation of current due to circulating current is suppressed, thus making it possible to provide a highly efficient motor controller at low cost.

What is claimed is:

1. A motor controller for a synchronous motor equipped with a rotor position sensor which comprises: a power inverter circuit including a plurality of switching elements for switching power supply to drive windings of said synchronous motor and diodes connected in parallel to said switching elements, a DC power source for supplying power to said power inverter circuit, a speed adjusting instruction circuit for outputting speed adjusting instruction for said synchronous motor, a PWM circuit for outputting pulse width-modulated signals according to said speed adjusting instruction, a forward/reverse decision circuit for outputting a reverse rotation instruction signal if the speed adjusting instruction is of a speed reduction signal above a predetermined level and for outputting a forward rotation instruction signal if said speed adjusting instruction is of signals other than said speed reduction signal, a distributing circuit for outputting switching signals for determining switching state of said power inverter circuit according to the signal of said rotor position sensor and forward/reverse rotation instruction, a first logic circuit which receives said pulse width-modulated signal and said switching signal as inputs, while outputting the drive signal for the switching elements connected to the minus (or plus) side of said DC power source, and a second logic circuit which receives said pulse width-modulated signal, said switching signal and said forward/reverse rotation instruction as inputs, while outputting the drive signal of said switching elements connected to the plus (or minus) side of said DC power source, said first logic circuit outputting the drive signal for conducting said switching elements only when said pulse width-modulated signal and said switching signal are both of ON signals, said second logic circuit outputting the drive signal to said switching elements only when said pulse width-modulated signal and said switching signal are both of ON signals or when said switching signal is of ON signal, with said forward/reverse rotation instruction being of a forward rotation signal.

2. A motor controller as claimed in claim 1, wherein said first logic circuit is constituted by AND circuits having outputs of said distributing circuit and said PWM circuit as inputs, said second logic circuit being constituted by an OR circuit having outputs of said forward/reverse decision circuit and said PWM circuit as inputs, and AND circuits having outputs of said OR circuit and said distributing circuit as inputs.

3. A motor controller as claimed in claim 1, wherein said switching elements of said power inverter circuit are constituted by power transistors including a plurality of pairs of two transistors connected in series across said DC power source, with said drive windings being connected to junctions of the respective pairs of transistors.

4. A motor controller for a synchronous motor equipped with a rotor position sensor which comprises: a power inverter circuit including a plurality of switching elements for switching power supply to drive windings of said synchronous motor and diodes connected in parallel to said switching elements, a DC power source for supplying power to said power inverter circuit, a speed adjusting instruction circuit for outputting speed adjusting instruction for said synchronous motor, a PWM circuit for outputting pulse width-modulated signals according to aid speed adjusting instruction, a current detecting circuit which detects current flowing through said DC power source so as to ouput ON signal to said PWM circuit when said current is smaller than a predetermined value, and OFF signal to said PWM circuit when said current is larger than said predetermined value, a forward/reverse decision circuit for outputting a reverse rotation instruction signal if the speed adjusting instruction is of a speed reduction signal above a predetermined level and for outputting a forward rotation instruction signal if said speed adjusting instruction is of signals other than said speed reduction signal, a distributing circuit for outputting switching signals for determining switching state of said power inverter circuit according to the signal of said rotor position sensor and forward/reverse rotation instruction, a first logic circuit which receives said pulse width-modulated signal and said switching signal as inputs, while outputting the drive signal for the switching elements connected to the minus (or plus) side of said DC power source, and a second logic circuit which receives said pulse width-modulated signal, said switching signal and said forward/reverse rotation instruction as inputs, while outputting the drive signal of said switching elements connected to the plus (or minus) side of said DC power source, said first logic circuit outputting the drive signal for conducting said switching elements only when said pulse width-modulated signal and said switching signal are both of ON signals, said second logic circuit outputting the drive signal to said switching elements only when said pulse width-modulated signal and said switching signal are both of ON signals or when said switching signal is of ON signal, with said forward/reverse rotation instruction being of a forward rotation signal.

* * * * *